United States Patent [19]
Soto

[11] 4,327,597
[45] May 4, 1982

[54] TORQUE CONVERTER

[76] Inventor: Jose M. Soto, P.O. Box 783, S. Lancaster, Mass. 01561

[21] Appl. No.: 31

[22] Filed: Jan. 2, 1979

[51] Int. Cl.³ ............................ F16H 1/06; F16H 1/20
[52] U.S. Cl. ..................................... 74/415; 74/84 R; 74/113; 74/413; 74/434; 74/436
[58] Field of Search ............... 74/413, 415, 436, 84 R, 74/434, 820, 112, 113

[56] References Cited

U.S. PATENT DOCUMENTS

| | | | |
|---|---|---|---|
| 2,313,445 | 3/1943 | Lamb | 74/415 X |
| 3,063,301 | 11/1962 | Hall | 74/84 X |
| 3,279,274 | 10/1966 | Braun | 74/415 X |
| 3,377,877 | 4/1968 | Eaton | 74/415 X |
| 3,525,270 | 8/1970 | Queffeleont | 74/415 |
| 4,124,729 | 11/1978 | Kubota | 74/436 |

FOREIGN PATENT DOCUMENTS

| | | | |
|---|---|---|---|
| 847257 | 8/1952 | Fed. Rep. of Germany | 74/112 |
| 187226 | 11/1923 | United Kingdom | 74/415 |
| 474426 | 9/1975 | U.S.S.R. | 74/436 |

*Primary Examiner*—Leslie Braun
*Attorney, Agent, or Firm*—Thompson, Birch, Gauthier & Samuels

[57] ABSTRACT

Multiple slotted drive disks are secured in parallel relationship to a drive shaft. The slots are radially arranged and the slots of each disk are aligned. Movable rods are received in the slots. A slotted driven disk is secured to a driven shaft, which driven shaft is parallel to the drive shaft. The drive and driven disks are arranged in parallel intersecting relationship such that the rods will be received in the slots of the driven disk through a portion of the revolution. Relative movement is effected between the shafts via the rods. The relationship of angular velocity between the shafts is kept constant and an infinite torque converter is provided.

19 Claims, 22 Drawing Figures

TORQUE CONVERTER

BACKGROUND AND BRIEF SUMMARY OF THE INVENTION

The simplest and most common torque converters are gears. The torque ratio and the speed ratio are established by the gears radii and relative ratios. Gear configurations have the limitation of a fixed velocity or torque conversion ratio.

There also exist torque converters such as the fluid converter used in automatic transmission for automobiles. However, this approach is expensive and energy consuming. Other torque converters consist of a centrifugal control with variable pulleys. This approach is energy consuming due to belt friction and it is capacity limited. Further there are torque converters which are limited in capacity or conversion ratios, or operate at low efficiency (energy consuming).

My invention is broadly directed to an infinite ratio torque converter and method of using the same. A drive shaft and a driven shaft are arranged in parallel. The drive shaft includes at least one drive member, such as a slotted disk and the driven shaft includes at least one driven member such as a slotted disk. Variable transfer means are provided to effect motion of the driven shaft by the drive shaft which transfer means in combination with the distance between the shafts comprises an infinite angular displacement ratio or speed ratio between the driven shaft and the drive shaft.

In a preferred embodiment slotted disks are secured to the shafts and the variable transfer means include rods received in the slots of at least one of the disks. The rods in effect vary the relative distance between the shafts.

My invention in the preferred embodiment comprises a torque converter and a method of controlling the speed ratio; which converter has a plurality of slotted disks connected to a plurality of shafts and means to transfer motion from one shaft to another; or alternatively a plurality of slotted disks on one shaft and a movable slot equivalent assembly on the other shaft to achieve an infinite ratio conversion.

In one aspect of the preferred embodiment of the invention the disks have eight slots radially arranged. Each slot at 45° from the other. The drive shaft has at least two slotted disks with eight rods connected between the two disks or alternatively a movable slot assembly that holds the rods.

In another aspect of the preferred embodiment, means are provided to control the rod movement at the points where the driven disks and the drive disks interact. Such means maintain the rods position such that the disk movement achieves a controlled angular displacement relationship.

DESCRIPTION OF PREFERRED EMBODIMENTS

Figure 1:
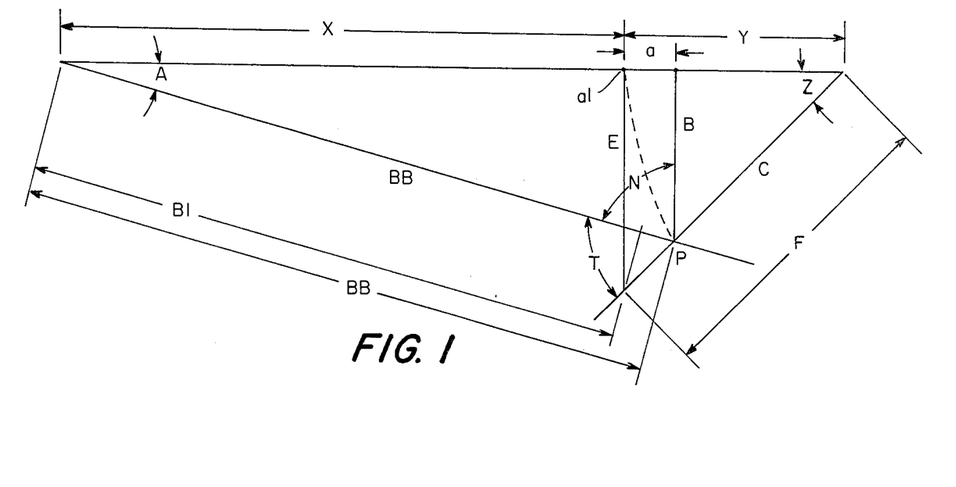
FIG. 1 is an equation source diagram.

Referring to FIG. 1, the torque converter equations source diagram is shown. The angle Z is the drive shaft displacement and angle A is the driven shaft displacement. The angle A displacement will be a linear function of angle Z.

$$A = \frac{X}{Y}(A), A = \frac{Y}{X}(Z) \tag{1}$$

$$BB = \frac{X+a}{\cos A} \quad C = \frac{Y-a}{\cos Z}, \tag{2}$$

$$B = C \sin Z \quad C = \frac{Y-a}{\cos Z} \sin Z = (Y-a) \tan Z/C \tag{3}$$

$$B = BB \sin A \quad B = \frac{X+a}{\cos A} \sin A = (X+a) \tan A \tag{4}$$

$$a = \frac{Y \tan Z - X \tan A}{\tan Z + \tan A} = \frac{Y \tan\left(\frac{X}{Y} A\right) - X \tan A}{\tan\left(\frac{X}{Y} A\right) + \tan A} \tag{5}$$

$$\vec{P} = \vec{B} + \vec{a} \tag{6}$$

X equals an equivalent driven gear
Y equals the equivalent drive gear
A equals the driven disk displacement
Z equals the drive disk displacement As will be explained in the preferred embodiment $$DA = \frac{Y}{X} DZ.$$

Means are provided to effect the relative positions of the drive and driven shafts such that this relationship will always be maintained.

The angle A displacement will be a linear function of angle Z (equation 1) displacement. The distance Y divided by the distance X establishes the conversion ratio. In regular gear configuration X and Y would correspond to the gears' radius. Referring to FIG. 1 point a1 will be the point of contact of the means to transfer the motion from one shaft to the other or more specifically between the rod held in one disk engaging the other disk. Point P identifies the locus of points created by the intersection of the line C and line B, or the path the held rod of one disk will travel while engaged in the slot of the other disk.

Figure 2:
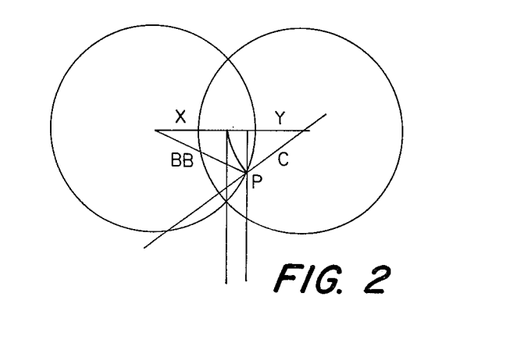
FIG. 2 is a graphical illustration of the relationship between the drive and driven shafts.

In the multiple ratio configuration of the preferred embodiment the line B represents one slot in the driven disk and line C one slot in the drive disk. Point P in both FIGS. 1 and 2 represents the moving rod that follows the same path as the locus of points P. The equation for this motion is set forth in equation 6. Vectors B and a are functions of A as per equations 4 and 5.

As shown in FIG. 2, the relationship between slot B of one disk and slot C of another disk is clearly illustrated.

Figure 3:
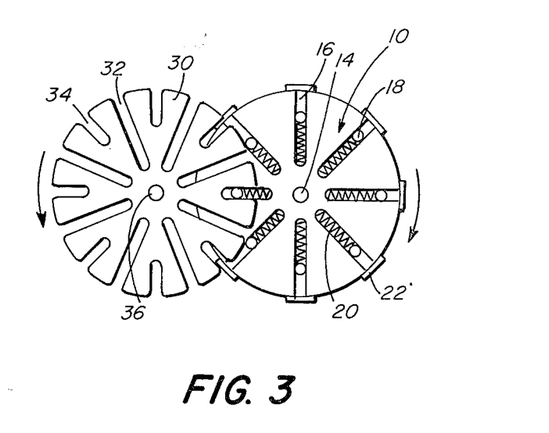
FIG. 3 is a front elevation of disks on drive and driven shafts interacting.

FIG. 3 further illustrates the principle of the invention and the basic structure of the preferred embodiment of the invention wherein a drive disk 10 and a driven disk 30 are shown interacting. Referring to FIG. 3 the drive disk 10 is pinned to a drive shaft 14 and comprises eight radially arranged slots 16. The drive shaft may be suitably connected to any source of powder to effect its rotation. Received within each slot 16 is a reciprocating rod 18 which rotates with the disk 10. The rods 18 are maintained in parallel relationship to the drive shaft 14. Although any suitable structure may be used to maintain the rods in this relationship typically an identical disk 10 is also secured to the drive shaft 14 thus providing a drive disk on either side of the driven disk 30. The slots of the two disks 10 are aligned and a single rod 18 passes through each set of aligned slots 16.

The rods 18 are held in reciprocating position by a spring 20 received in the slot which biases the rod 18 outwardly. Across the opening of each slot is a stop member 22 to retain the rods 18 within the slots 16. The driven disk 30 comprises slots 32 dimensionally equal to the slots 16 and an alternating set of slots 34 arranged on 45° lines having a depth one half that of the slots 32. The slots 34, as will be described achieve a ratio of $Y/X=0.5$. The driven disk 30 is pinned to a driven shaft 36.

In this embodiment the number of paths the rods may follow in interacting, or ratios $Y/X$, is limited to a fixed number. The fixed number is dependent upon the number of slots per quadrant of the disk. For the disks shown in FIGS. 3-6 these ratios are 1:1, 0.75-1 and 0.5:1. If there were 12 slots per disk (3 slots per quadrant) the ratios would be 3:1, 2:1, 1:1, 0.5:1 and 0.3:1. For purposes of illustration, the invention will be described in reference to the use of 8 slots per disk and only two ratios 1:1 and 0.5:1.

Figure 4:
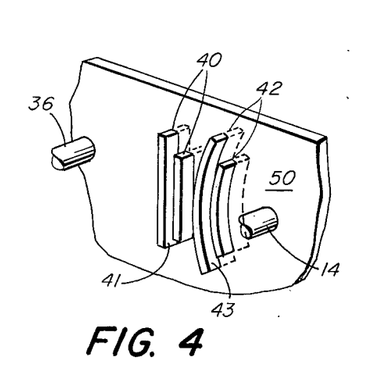
FIG. 4 is a perspective view of rod guides used in the preferred embodiment.
Figure 5:
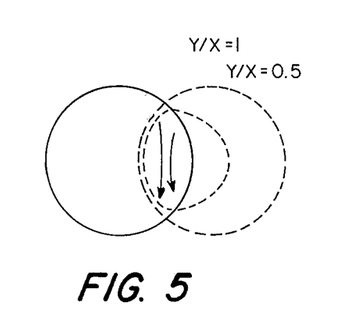
FIG. 5 is a rod movement diagram.

Referring to FIG. 4 the path of the rods 18 is controlled by guide sets 40 and 42 which form channels 41 and 43 through which the rods 18 may travel. The guide sets provide ratios of 1.0 and 0.5 respectively. The guide sets determine the path of the rods in the drive disks 10 while they are engaged in the slots of the driven disk 30 and thus the $Y/X$ ratio. In FIG. 5, the paths of the rods 18 are shown by heavy arrows when intersected by either of the guide sets 40 and 42. The path of one rod, if neither guide set is activated, is shown in dotted lines.

Figure 6:
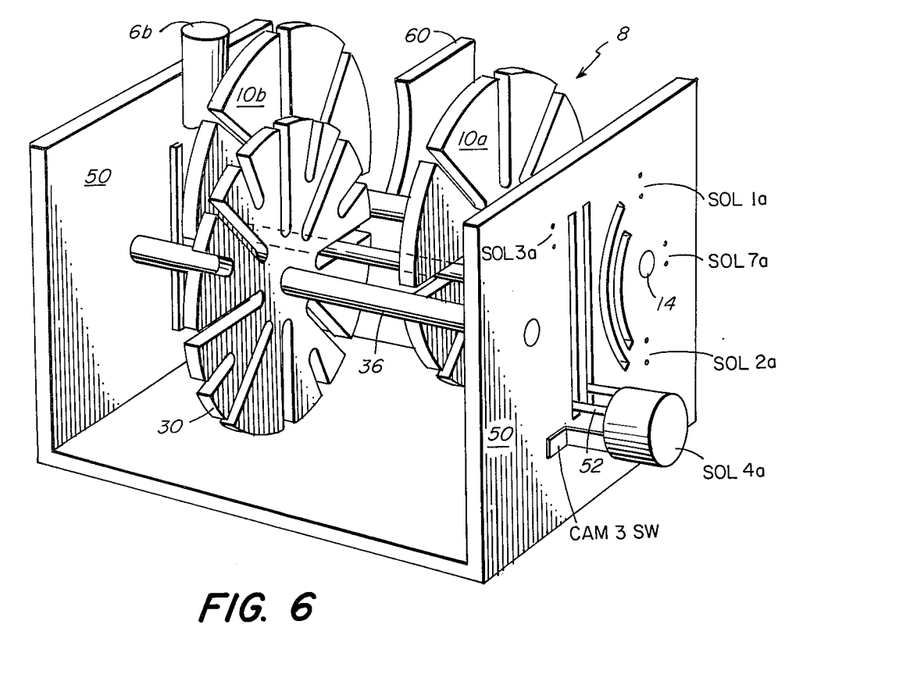
FIG. 6 is a perspective view of the torque converter of the preferred embodiment.

A torque converter 8 embodying the preferred embodiment of the invention is shown in FIG. 6. The drive shaft 14 and the driven shaft 36 are journalled in opposed walls 50 with the disks 10 and 30 overlapping as shown. There are guide sets 40 and 42 on both walls 50. Only one set will be described in detail. As is apparent from FIGS. 4 and 6, the rods 18 will follow the guide set which is actuated. As the rods travel through the channel defined by the actuated guide set, they will engage the driven disk 30. In FIG. 4 all guides have been shown extended for clarity but only one set would be extended in operation. The drive shaft 14 can be secured to any suitable means of motive power, such as coupled to an electric motor (not shown).

The net result is that $dA/dt = K\, dz/dt$ where K is the ratio constant $(Y/X)$. Any change in angle Z will be proportional to a change in angle A. This is accomplished because the guides 40 and 42 are designed based on the locus of points formed by P in FIG. 1 and would follow the coordinates "a" and "B", see equations 3 through 6.

It is to be understood that when a guide set is actuated, the sets on both walls 50 are actuated such that both ends of the rods 18 are received in the channel defined by the guide set. As shown in FIGS. 4 and 6, for the guide set 40, $Y/X=1$ and for guide set 42, $Y/X=0.5$.

The guide sets are slidably received in slots formed in the walls 50 and secured to solenoids in any suitable manner. When the guide sets are actuated they extend into the housing and intercept the path of the rods 18 such that the rods will follow the path defined by the channel. When de-actuated by the solenoid, the guide sets are withdrawn such that they do not contact the rods 18.

The guide sets 40 and 42 are adapted to reciprocate in the slots formed on the walls 50 between an actuated position intercepting the rods, and a deactuated position, withdrawn from the path of the rods. Any structure mechanical, electromechanical or electronic may be used to effect the movement of the guides. In this embodiment solenoids are used and one solenoid 4a is shown functionally. The solenoid 4a is secured to the walls 50 and a rod 52 is secured to each of the guides of the set 40. The use of a retractable rod or arm with a solenoid is well known and need not be described in detail. The other solenoids are only indicated by letters but each solenoid is arranged as is solenoid 4a. Solenoids 3a and 4a activate each of the guides of the set 42 while the corresponding (mirror image) guides on the opposite wall 50 will be activated by solenoids 3b and 4b (not shown). Solenoids 1a, 2a; and 1b, 2b; (the latter not shown) actuate guides 42.

Figure 7:
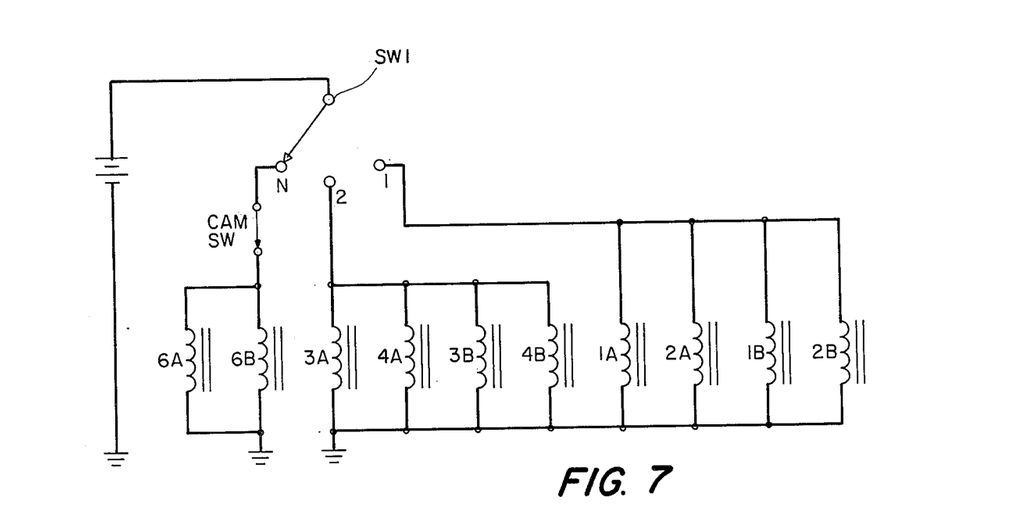
FIG. 7 is a schematic of the circuit to control the guides for spaced changes.

A schematic of a speed change switch SW-1 and associated circuitry is shown in FIG. 7. When the speed change switch SW-1 is at position 2, solenoids 3a, 3b and 4a and 4b are activated and the solenoids actuate the guide sets 40 inwardly whereby they define the channels 41 and intercept the rods 18 such that the rods 18 travel through the channels 41. The channels control the locus or the specific path of the rod 18 while they are engaged with the slots 32 of the driven disk 30.

If the switch SW-1 is set to position 1 then the solenoids associated with the guide sets 42, 1a, 2a and 2a, 2b will be activated and these guides defining their associated channel 43 will intercept the path of the rods and thus determine the speed ratio between the driven and drive disks.

When the ratio $Y/X$ is 0.5, the drive disks 10 are displaced 90° while the driven disk 30 is displaced only 45°.

Figures 8, 9, 10:
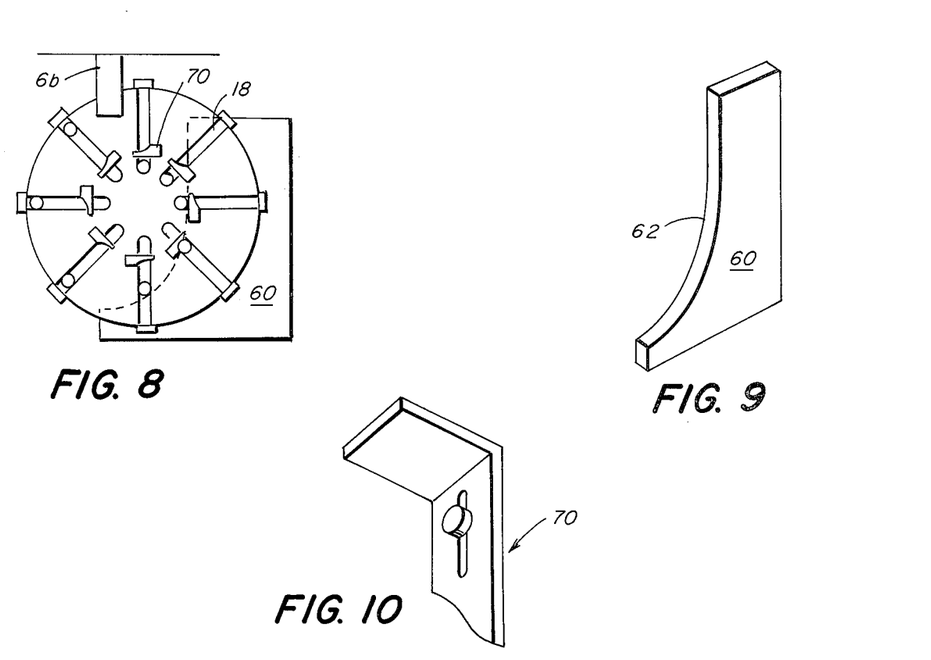
FIG. 8 is a front elevation of a disk and cam plate.
FIG. 9 is a perspective view of the cam plate.
FIG. 10 is a perspective view of a latch.

Referring to FIGS. 6, 8 and 9, a plate 60, having a camming surface 62 is positioned between the disks 10. The plate 60 cams the rods 18 inwardly, as the drive disks 10 rotate. The rods 18 are locked by a rod latch 70 pivotally secured in each slot 18. The latch 70 is shown in FIG. 10. Latches which are actuable by solenoids are well known and need not be described in detail. Solenoids 6a and 6b actuate the latches, solenoid 6a (not shown) is used with disk 10a and a solenoid 6b is used with disk 10b. When the device is in neutral, the solenoids 6a and 6b, maintain the rods 18 in their locked position to prevent engagement. That is, the rods 18 are outside the circumference of the disk 30. In this instance, no power is transmitted from the drive disks 10 to the driven disk 30 because there is no connection therebetween.

In operation as the drive disks 10 rotate the rods 18 contact the camming surface 62 and are forced inwardly against the action of the springs 20. The latches 70 hold the rods 18 inwardly in a locked position. If the switch SW-1 is on the neutral (n) position, solenoids 6a and 6b will not release the latches 70 and thus no power is transmitted to the driven disk 30. When the switch SW-1 is in either position 1 or 2, the associated guides are actuated. Also the solenoids 6a and 6b will release the rods 18, see FIG. 8. The rods will be intercepted by the actuated guides, either 40 or 42, and travel in the channel, while engaged with the slots 32 of the driven disk 30, see FIG. 5.

To ensure proper synchronization of the drive and driven disks, one of the slots 32 of the driven disk 30 must be aligned with a slot 16 of the drive disk 10, when switching SW-1 to either position 1 or 2. By alignment is meant, the aligned slots 32 and 16 are in register and lie in the same plane. In the simplest form, this is accomplished by manually positioning the disks. This is not necessary when switching between positions 1 and 2. Of course any means may be used to effect the proper synchronization. The synchronization system used in the next embodiment is also suitable for this embodiment.

An alternative embodiment of the torque converter embodying the present invention is shown in FIGS. 11–18. In this embodiment there are opposed walls 102, only one shown, in which are journalled drive 104 and driven shafts 106 arranged in parallel relationship. To the shafts are pinned drive 110 and driven 120 disks, which are broken away for clarity.

Figure 13:
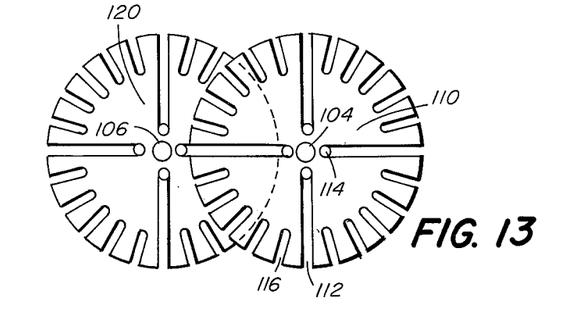
FIG. 13 is a front view of the disks used in FIG. 11.

The drive disk 110 and driven disk 120 are identical as shown in FIG. 13.

In this embodiment only one drive and one driven disk each carrying four rods are used. However, two drive disks, as in FIG. 6, or two driven disks or multiples of either in any combination may be used depending upon the application of the torque converter. For example, assemblies of drive-driven-drive; driven-drive-driven, driven-driven-driven-drive, etc. may be used. Each disk being identical, only one will be described in detail. The disk 110 includes four radial slots 112 arranged 90° apart. Received in each slot 112 is a rod 114. Between each pair of slots 112 are five slots 116 equally spaced 15° apart between the slots 112. This allows ratios of 3:1, 2:1, 1.5:1, 1.2:1, 1:1, 0.86:1, 0.66:1, 0.5:1 and 0.3:1. The possible combination of ratios is limited by the number of slots per quadrant (90°) and the distance between shafts. In this embodiment, as with the preferred embodiment, channels are formed for the rods to travel through to effect the multiple Y/X ratios.

Figure 11:
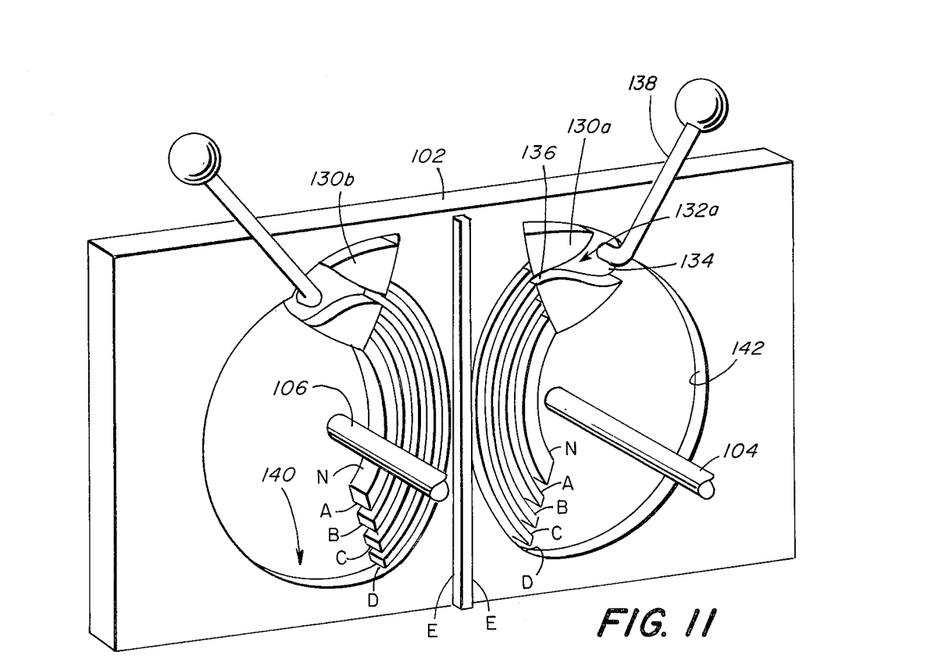
FIG. 11 is a perspective view partly fragmentary of an alternative torque converter.
Figure 12:
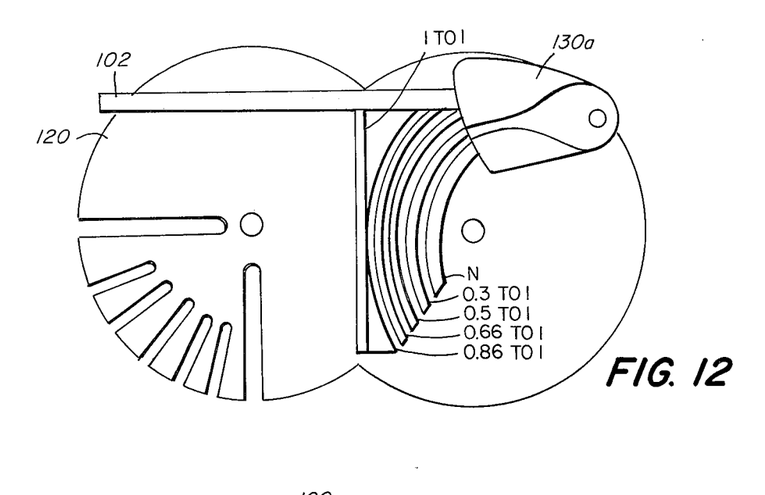
FIG. 12 is a front view of the alternative embodiment.

Referring to FIGS. 11 and 12, the channels are formed in the walls 102. The channels are identified by their ratios and the ratios are achieved according to the following chart. The specific dimensioning of shaft sizes, length and diameter; distance between shafts; slot sizes, length and width; disk diameter, etc. is determined in accordance with the formulae 2 through 6.

For example, 5" diameter disks are used. The drive and driven shafts are 3" apart. The slots 112 and 3/16" wide and 2 3/16" deep. The slots 119 are 3/16" side and 1⅛" deep. The rod 114 is dimensioned to be freely slideable in the slots and the disk thickness is varied according to the load.

SELECTION GUIDE POSITION IN RELATION TO THE DESIRED RATIO

| Ratio | Driven speed | Drive speed | Guide 130a Position | Guide 130b Position | Rod Set #1 | Rod Set #2 |
|---|---|---|---|---|---|---|
| .3-1 | .3 | 1 | A | N | Engaged | Free |
| .5-1 | .5 | 1 | B | N | Engaged | Free |
| .66-1 | .66 | 1 | C | N | Engaged | Free |
| .86-1 | .86 | 1 | D | N | Engaged | Free |
| 1-1 | 1 | 1 | E | N | Engaged | Free |
| 1.2-1 | 1.2 | 1 | N | D | Free | Engaged |
| 1.5-1 | 1.5 | 1 | N | C | Free | Engaged |
| 2.0-1 | 2 | 1 | N | B | Free | Engaged |
| 3.0-1 | 3.0 | 1 | N | A | Free | Engaged |
| Neutral | 0 | 1 | N | N | Free | Free |

There are two guides 130a and 130b, rotatably pinned to the wall 102. The guide 130a includes a track 132a through which passes the ends of the rods (set #1) in the drive disk 110. The track is formed in the surface of the guide facing the ends of the rods and is substantially Y shaped with the open portion 134 of the Y facing the direction of travel of the rods and the extending straight portion 136 of the Y at its end to the channels.

The locations of the channels are shown in FIG. 11. To achieve a 1:1 ratio when one guide is moved to position E a fixed extending guide 138 controls the path of that set of rods and the other guide is in neutral "N". The walls 102 include substantially circular recessed portions 140 having guide surfaces 142. The surfaces 142 retain the rods 114 in the slots 112. The centrifugal force acting on the rods 114 biases them outwardly. Thus the rods are retained by the surfaces 142 when they are not in the guide member 130 or the channels.

In operation of this embodiment two drive disks and two driven disks are used in the relationship drive-driven-driven-drive. Generally, a pair of disks are most suitable for carrying rods to achieve more stability. The rods are directed into the desired fixed channels by movement of the guides 130a and 130b. The guides are moved according to the above table to effect the desired ratios.

If desired, the guides 130a and 130b could be automatically actuated by any suitable electric, mechanical or electronic circuit. As with the preferred embodiment once the disks are aligned in neutral, such as by hand, shifting among the ratios requires no further synchronization or manipulation. For more automated operation an idle clutch is provided.

Figure 14:
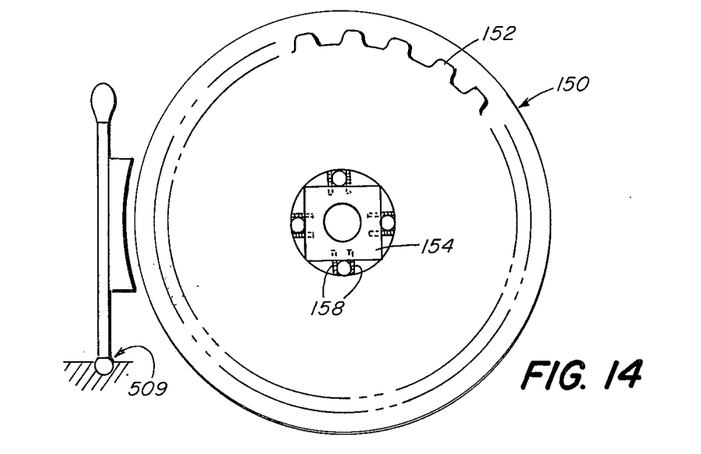
FIG. 14 is a front view of an idle clutch.
Figure 15:
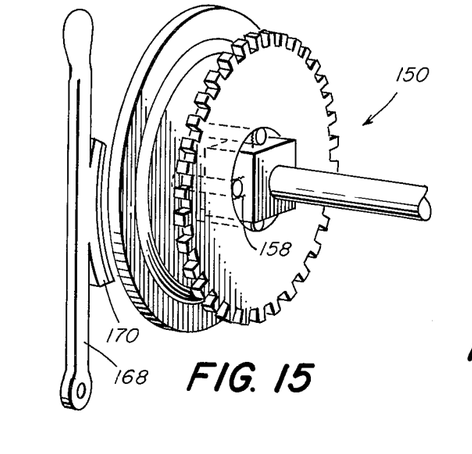
FIG. 15 is a perspective view of an idle clutch.
Figure 16:
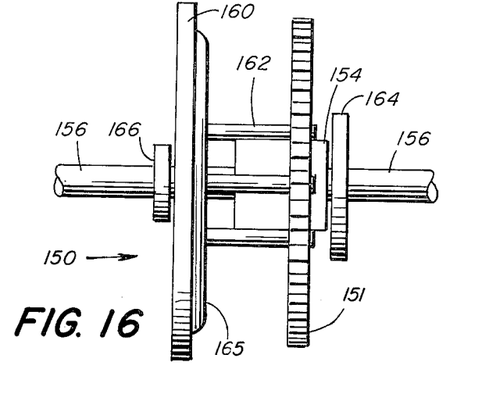
FIG. 16 is a side view of the idle clutch.

For automatic synchronization an idle clutch 150 combination is used as shown in FIG. 15. The idle clutch 150 is shown in FIGS. 14-16 and comprises an idle gear 152 received over a square shaft 154. The square shaft is joined on either end (see FIG. 16) to round shafts 156. The square shaft 154 has eight (8) finger-like springs 158 comprising 4 sets of 2, each set disposed on one surface of the square shaft. A wheel 160 includes four equally spaced studs 162 extending from one surface thereof which studs are received between each set of springs on the square shaft. The wheel 160 includes an aperture such that the round shaft 156 does not engage the wheel. The wheel 160 is supported solely by the studs 162 engaging the shaft 154. A collar 164 prevents longitudinal movement of the gear 152 away from the wheel 160. A circular convex bearing surface 165 is formed on the wheel 160. This prevents movement of the gear 152 in the other direction. A collar 166 prevents movement of the wheel 160 away from the square shaft 154. A lever 168 is fixed adjacent the wheel 160 and includes a brake 170. The lever is adapted for pivotal movement such that the brake may engage the outer edge of the wheel 160 and deflect the wheel laterally. When the brake 170 contacts and moves the wheel 160 the wheel carries with it the studs 158 providing driving frictional engagement between the square shaft 154 and the gear 152 via the studs 162. If the shafts 154-156 are moving counterclockwise, the studs 162 move clockwise when the brake engages the wheel 160. The gear 151 is thus locked to the square shaft in the same manner as a normal one-way clutch functions as long as the brake 170 is engaged.

Figures 17, 18:
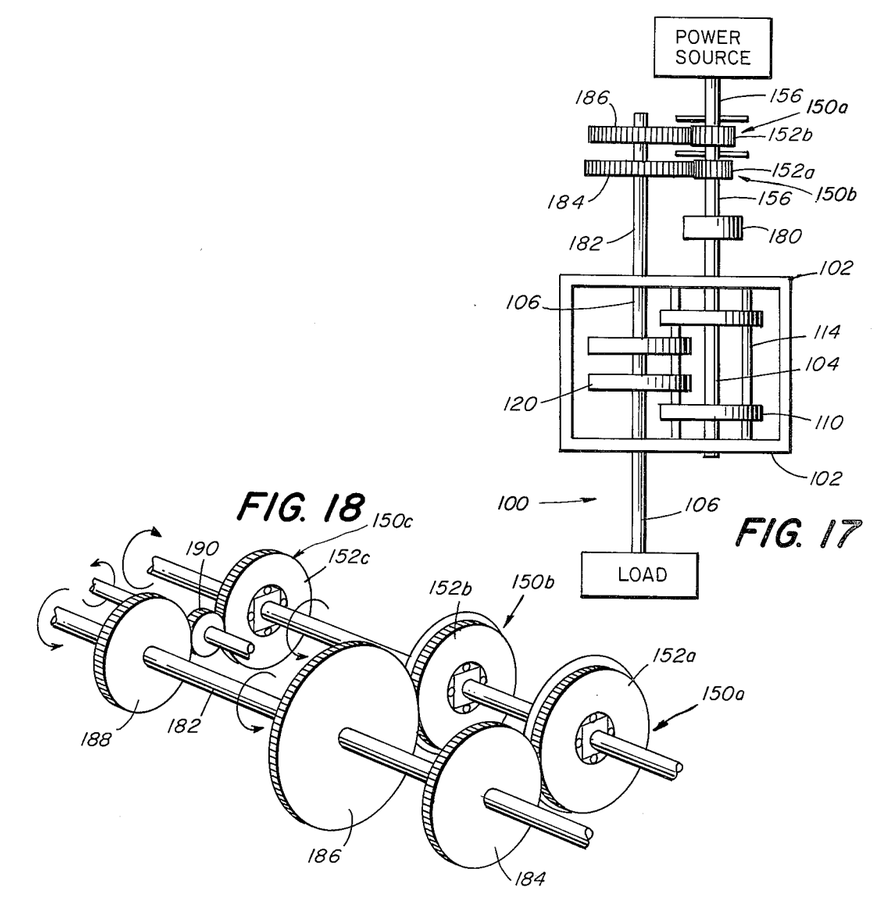
FIG. 17 is a schematic of a synchronized shifting device used with the torque converter of FIG. 11.
FIG. 18 is a perspective view of a reverse shifting device.

FIG. 17 illustrates the converter 100 in combination with two idle clutches 150a and 150b and a standard friction clutch 180.

Before the slotted disks 120 and 110 can be used for a power transfer, one slot of the driven disk 120 must be aligned with a slot in the drive disk 110. This interaction is in the locus of points that establishes the selected ratio. An idle clutch such as shown in FIGS. 14-16 is used. In FIG. 17 the idle clutches are and identified as 150a and 150b. Otherwise the idle clutches 150 in FIG. 17 are identical to the idle clutch 150 of FIGS. 14-16. Also the square-round shaft combination 154-156 as a unitary construction is used in FIG. 17 as in FIGS. 14-16.

Based on the ratios set forth in the proceeding table a shaft 182 is joined to driven shaft 106 for rotation therewith. Gears 184 and 186 fixed to the shaft 182 mesh with gears 152a and 152b respectively. When gear 152a turns ten revolutions gears 184 and 186 will turn one revolution and gear 152b will turn twenty revolutions. Gear 152b will rotate faster than the shafts 154-156 and no power will be transmitted. This means that when both clutches 150a and 150b are engaged at the same time this higher ratio will override the lower ratio. The friction clutch 180 is standard and when not engaged no power is transferred to the drive shaft 104.

The drive shaft combination round-square is engaged directly to a power source such as an engine. The friction clutch 180 only effects the rotation of the drive shaft 104 within the torque converter 100. In the operation of converter 100, when the power source is actuated the square-round shaft 154-156 commences rotation. The shaft 104 in the converter 100 does not rotate the friction clutch not being engaged. Also no power is transferred to the parallel shafts 182-106 until actuation of an idle clutch 150 then transfers motion to the engaged gear. Typically the idle clutch 150a for the lower ratio will first be actuated. Then the shaft 106 within the converter 100 commences to rotate carrying with it the associated disks and rods. To ensure engagement of the rods in a slot, the friction clutch 180 is then engaged to transfer motion to the drive shaft 104 in the converter 100. The pressure on the friction clutch is increased thereby increasing the speed of the shaft and the associated disks until such time that a rod engages a slot. Once engaged the friction clutch 180 is then fully engaged to transfer maximum driving force from the power source.

When a rod engages a slot, it is immaterial which slot on the disk that it engages and whether or not the rod is carried by the drive or driven disk. The positioning of the guide members 130a and 130b direct the rods into the appropriate channels for the desired ratio. These channels are defined such that even if the rod, i.e., of a driven disk enters the slot of the drive disk which is itself carrying a rod, the locus of points through which it travels or more particularly the channels through which it travels are such that they would not overlap.

When the torque converter 100 is initially synchronized, the first idle clutch with the lower ratio is actuated to commence movement of the driven disk. Subsequently, the second idle clutch is actuated to provide the second higher ratio. The friction clutch is engaged initially, very lightly, and it could be prior to during or subsequent to the actuation of either the first and/or second idle clutches. The original motion imparted to the driven shaft could be effected by a single clutch such as a single one-way clutch. However, where the load is heavy as is well known it is preferable to gear up to the higher speed. When gearing up from 20:1:10:1, the 10:1 gear ratio is selected to be equal to or greater than the highest achieveable ratio in the converter 100.

The rod position must be controlled until the driven disk 120 is moved and aligned. When aligned such that a rod of one disk is received in the slot of the other disk power will be transferred. Once the first engagement is made and the guides 130a and 130b remain fixed then the drive and driven disks will continue to rotate and transfer power. This continues until a new ratio is desired. For example for the ratio 0.5:1.0 a rod 114 enters the cam selection guide 130a and is carried through the selection guide. For the 0.5:1 ratio, the cam selection guide 130a will be in position B and cam selection guide 130b will be in position N. The idle clutch 150b (gear 152b) is actuated. Power is then transferred from the gear 152b to the gear 184 to move the driven shaft 106. The ratio of gears 152b/184 is smaller than the smallest ratio in the converter 100 which is 0.3:1. The ratio 152b/184 is equal to 0.1:1. In order to move the driven slot faster idle clutch 150a (152a) is actuated. This results in driving gear 186 and the ratio between the gears 152a and 186 is 0.2:1. The friction clutch 180 is actuated to move the drive disk until the rod 114 engages the driven disk.

The one-way clutches 150 both could be fully actuated at the same time that the friction clutch 180 is fully actuated in that the torque converter 100 has higher ratios and it will force the gears 152a and 152b to move faster than shaft 104. When it is desired to change from one ratio, such as 0.5:1, to a new ratio such as 0.66:1, the above procedure is followed. More specifically, the friction clutch 180 is applied. The guide selection levels 130a and 130b are set and subsequently the one-way clutches 140a and 140b are fully actuated.

If a reverse function is desired the arrangement shown in FIG. 18 is used. A third idle clutch 150c is used together with its idle gear 152c. A gear 188 fixed on the shaft 182 meshes with an idle gear 190 which meshes with gear 152c. For reverse, clutch 152c is engaged and 152a and 152b are disengaged.

Figure 20:
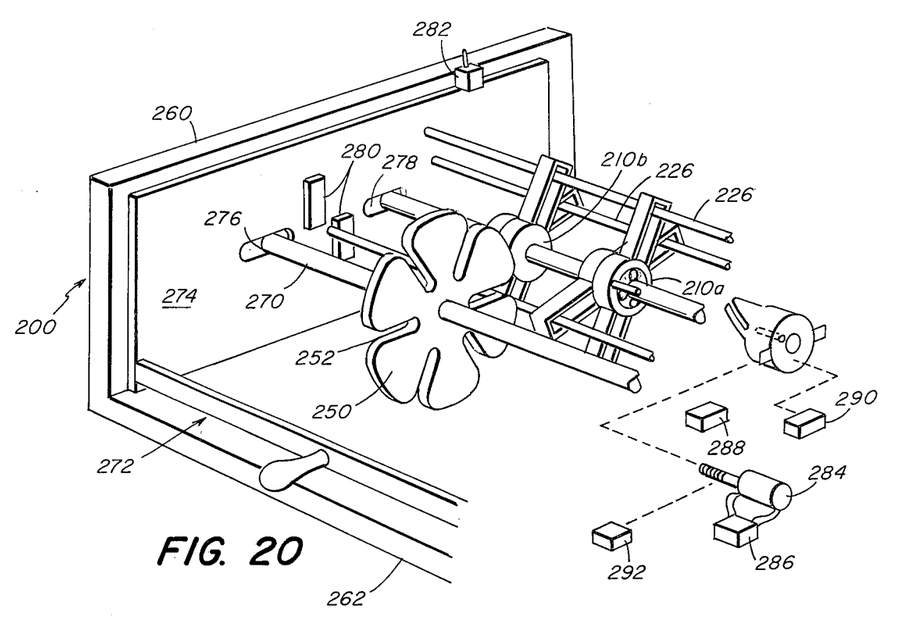
FIG. 20 is a perspective view of a torque converter using the variable slot disk.

A further torque converter embodying my invention is shown in FIG. 20 at 180.

In this embodiment a disk, spescifically the drive disk, comprises two pairs of arms each arm having a slot. Alternatively, the driven disk could be so structured. Each pair of arms is secured to the shaft for uni-directional movement. In this way the angular relationship between two adjacent slots in a disk is varied.

Any ratios within the range 0.3:1 to 3:1 may be achieved with this embodiment. For example, to achieve a ratio of 2.75:1 (or any ratio within the above range) the rod path, as with the prior embodiments, must be controlled thrugh the locus of points that allows this ratio. Also, the correct angular relationship between driven and drive disk (slots) must be controlled. For the illustrative ratio 2.75:1 the slots must be for the driven disk 45° and 20° for the drive disk. The 20° is effected by changing the angle between the arms every time that a rod enters a slot of the driven disk as will be described.

Figure 19:
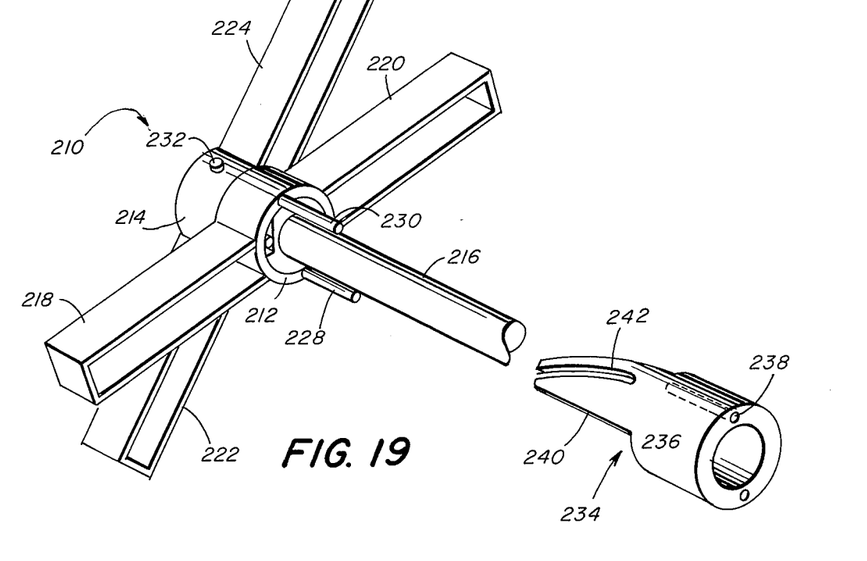
FIG. 19 is a perspective view of a disk which has variable slots.

Referring to FIG. 19 one drive disk 210 is shown and comprises two pairs of arms 218 and 220 joined to collar 212 and arms 222 and 224 joined to a collar 214. The collars 212 and 214 are mounted on one-way clutches such that they may only advance clockwise on a drive shaft 216. They may be held in position on the shaft 216 by collars or the like. Each of the arms 218–224 are slotted to carry rods 226.

Pins 228—230 180° apart extend from the collar 212 parallel to the shaft 216. A pin 232 extends upwardly from the collar 214.

A camming device 234, shown in telescopic perspective, comprises a sleeve 236 which is received over the shaft 216, positioning holes 238, cam plate 240 and slot 242. In operation the pins 228–230 are received in holes 238, and the pin 232 rides in slot 242.

Figure 21:
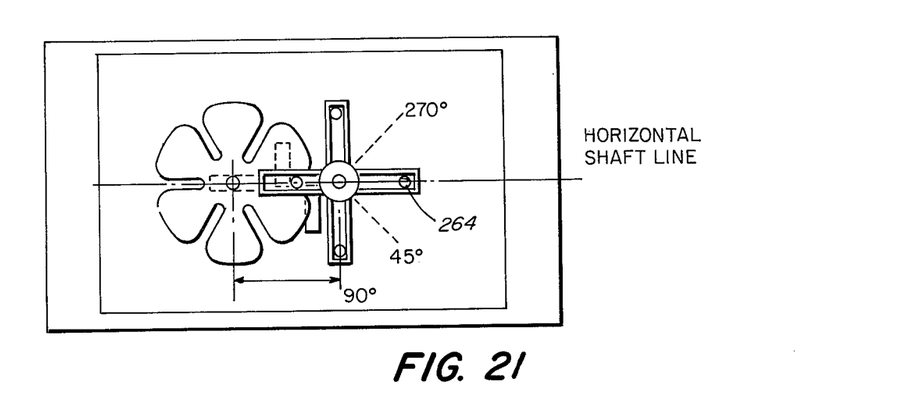
FIG. 21 is a front view of the disk relationship of FIG. 20.

Referring to FIGS. 20 and 21, the converter 200 comprises two drive disks 210 and a driven disk 250. The driven disk has a plurality of slots 252 formed therein, along 45° lines.

The converter 200 includes opposed walls 260 (only one shown) extending upwardly from a floor 262. The drive shaft 216 and a driven shaft 270 are journalled to the walls and spaced apart parallel relationship. The two drive disks 210a and 210b as described above, are identical except that the camming plate 240 does not contact the disk 210b. Rods 226 are received in the slots of the arms of the drive disks. Thus, in this embodiment there are a total of four rods as shown. The driven disk 250 with slots 252 spaced apart 45° is fixed to the shaft 270 intermediate the disks 210a and 210b such that the rods may engage the slots. Received between the walls 260 is a sliding tray 272 having walls 274 (only one shown). The walls 274 include apertures 276 and 278 through which pass the shafts 216 and 270. The apertures 276 and 278 are dimensioned to allow reciprocating movement of the tray.

Figure 22:
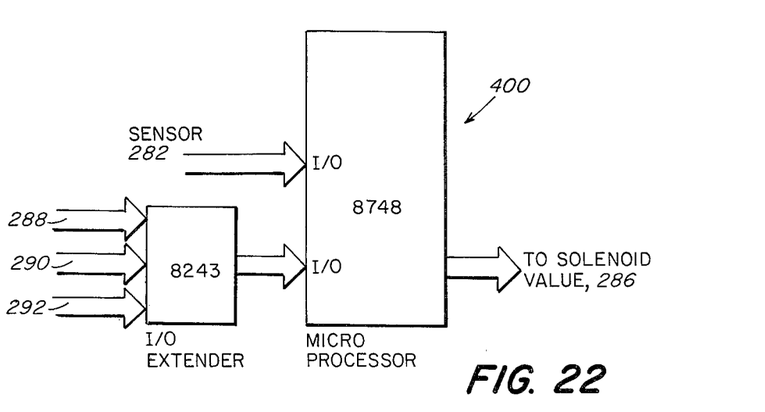
FIG. 22 is a block diagram of a microprocessor.

The rod path is controlled by the position of a guide set 280 mounted on the walls 274. The tray position is measured by a linear sensor 282 which reads the tray's position in reference to the frame. Once positioned, the tray is fixedly held in any suitable manner. The sensor provides a signal to a microprocessor 400 as shown in FIG. 22 such as an INTEL 8748. Such microprocessors have 27 lines for input or output (I/Oport) plus a 1K programmable ROM memory and working RAM, all in one integrated circuit. Once the guide set 280 is positioned to control the path of the rods, it is necessary to control the proper angular relationship between the slots of the drive disks. This is achieved by moving the camming plate 240. The guide set 280 depending upon its fixed position defines the locus of points through which the rods travel in the selected ratio in the ratio range 0.3:1 to 3:1.

As shown in FIG. 19, the camming plate 240 extends from a rotatable sleeve 236 which is received in sliding engagement on the shaft 216. The sleeve and thus the camming plate are moved inwardly and outwardly to change the relationship between the slots.

The sleeve is moved by a pneumatic cylinder 284 which in turn is controlled by a solenoid valve 286. The sensor 282 measures linear displacement previously described. A sensor 288 measures the driven shaft 270 angular position. A sensor 290 measures the angular position of arms 218–220 and 222–224. A sensor 292 measures the movement of the cylinder linear displacement and thus the cam plate displacement which is equal to the angular position of the arms 218–220 with respect to the arms 222–224. All these signals are input to the computer 400, 8 lines per sensor.

Referring to FIG. 19, the angular distance between adjacent arms 220–224 and 218–222 is controlled by the sleeve 236 movement. The pin 232 is at the middle of the slot 242. When the sleeve, and thus the plate 240 move outwardly away from the disk 210 arm 222 is advanced with reference to arm 218. Because of the engagement of the rods with the drive disk 210b movement of the drive disk 210a and associated slots effects a corresponding movement in the drive disk 210b. Arms 218 and 220 tend to move counterclockwise and arms 222 and 224 tend to move clockwise due to the force generated between pin 232 and the plate 240. Arms 218–220 cannot rotate counterclockwise because they will lock to the shaft 216.

This forces arms 222–224 to move clockwise. This increases the angle between arms 218 and 222. When the arm 222 finishes its power stroke, i.e., a rod 226 leaves a slot 252, it is advanced by moving the cam plate 240 outwardly. In this way, the arm 224 is advanced until the angle between arms 218 and 224 has the desired relationship.

When the arm 218 is leaving the power stroke, the arms 218–220 are advanced reducing the angle between the arm 224 and the arm 220 by moving the plate 240 inwardly. Arms 218–220 will be forced clockwise and arms 222–224 will be forced counterclockwise. Arms 218–220 will be advanced increasing the angle between the arms 218–224 and decreasing the angle between arm 220 and the arm 224 until the desired relationship is accomplished.

The computer program to control the sleeve sets forth logical steps to accomplish the control function.

The scale used is one bit equal 1/64 of an inch and one radian equals 64 bits. The horizontal lines (distance) between shafts (see FIG. 21) is the base for angular reference.

PROGRAM

I. Set stack pointer.
II. Hold while disk synchronized.
III. Read guide set position and store (this reads the guide set 280 position using the sensor 282).

IV. Let conversion ratio (Y/X) be equal to 3 (minus step 3)/step 3. (the same plate position is going to be equal to step 2 or the X value shown in FIG. 1. The Number 3 is the distance in inches between the shafts in the preferred embodiment. Y is equal to 3 minus step 3.

V. Read arm position 218-220 position and store. (This is the sensor 290).

VI. Read driven shaft position and store. (This is the sensor 288).

VII. Read arms 222-224 position and store. (Sensor 292 is scaled to measure the angle between arms of the adjacent arms sets. The middle scale is equal to mid travel or angle $\pi$-radian/4 between arms. The maximum outward movement of the cam plate effecting maximum separation between adjacent arms is 1: equal to $\pi$-radian/8. The maximum inward movement of the cam plate is 1" equal to $\pi$-radian/8. The movements are based on the position of the pins 232 in the center of the slot 242 in FIG. 19.

VIII. If arm 220 is offset from arm 224 more than 45° and less than 90° jump to 10, 9 if arm 220 is more than 180° offset from arm 224 and less than 270°; jump to 15. (instructions 8 and 9 analyze the positions of the slots as they finish the power stroke. The power stroke is when the rod 226 is engaged in the slot of the driven disk. When the power stroke is completed the arms are advanced until the next slot is engaged e.g. if arm 218 completes the power stroke the opposite arm 220 is advanced both until arm 220 commences the power stroke engaging a slot of the driven disk and it reaches the desired angular relationship with the previous arm e.g. arm 222. When arm 220 is 45° from the shaft line (see FIG. 21) arm 222 is at 180°. Arm 220 is advanced until its angular position, with respect to arm 222 is equal to the conversion ratio (Step IV) multiplied by 215°. This is because in the preferred embodiment a 45° slot difference is required in the driven disk.

IX. Jump to step 3.

X. In angle of arms 222-224 is not 0° or 180° jump to 3 (this prevents any angular change until the arms 218-220 are horizontal).

XI. Move cam plate outwardly.

XII. Substract reading in step 5 from 180° and add the reading step 7.

XIII. If result greater than conversion ratio multiply by 45° jump to 11. (the computer stays in loop 5-13 until the proper angle between arms 220 and 222 is reached.

XIV. Jump to step 3.

XV. Move plate inwardly.

XVI. Substract reading in step 7 from the reading in step 5.

XVII. If the result is greater than the conversion ratio multiply by 45° and jump to 15.

XVIII. Jump to step 3.

For synchronization the same structure and method as used in FIGS. 14-18 is used.

Having described my invention what I now claim is:

1. A torque converter which comprises:
   (a) a drive shaft having a drive disk secured thereto, a driven shaft in motion transfer relationship with the drive shaft having at least one driven disk secured thereto, the shafts arranged in parallel relationship, the drive disk and driven disk each comprising a plurality of slots, the driven disk comprising twice as many slots as the drive disk;
   (b) a plurality of rods received in a movable manner in at least two of the slots of one of said disks, the rods to effect transfer of motion between the shafts;
   (c) means to control the conversion ratio (Y/X) between the shafts which means includes a plurality of guide sets received in walls in a reciprocating manner, the guide sets when actuated adapted to control the path of the rods when the rods received in the slots of one disk are engaged in the slots of another disk, the guide sets defining channels and positioned to intercept the path of the rods such that they travel through the channels during motion transfer, each of the guide sets corresponding to a different conversion ratio; and,
   means to hold the rods in non-engagable releasable relationship in the drive disk, the guide sets dimensioned to provide conversion ratios of 0.5:1, 1:1 and 2:1.

2. The converter of claim 1 which includes:
   means to synchronize the initial movement of the drive and driven disks.

3. The converter of claim 1 wherein the drive disk comprises eight slots and the driven disk comprises sixteen slots.

4. The converter of claim 1 wherein the shafts are journaled to the walls.

5. A torque converter which comprises:
   (a) a drive shaft having a drive disk secured thereto, the drive disk having a plurality of slots therein;
   (b) a driven shaft in motion transfer relationship with the drive shaft having at least one driven disk secured thereto, the driven disk having a plurality of slots therein, the shafts arranged in parallel relationship, the longitudinal axes of the shafts perpendicular to a pair of opposed walls, each of the disks having a plurality of slots radially arrayed equidistant in the disk;
   (c) a plurality of rods received in a moveable manner in each of the slots of the disks to effect transfer of motion between the shafts, the disks positioned such that a rod is adapted to engage the slot of the other disk to effect the motion transfer; and,
   (d) means to control the conversion ratio (Y/X) between shafts which includes means to define the path of the rods while the rods received in the slots of one disk are engaged in the slots of another disk, the means to define the path comprises
   a plurality of guide sets including two sets of channels formed in each of the opposed facing surfaces of the walls, each of the channels corresponding to a different conversion ratio, said guide sets positioned to intercept the path of the rods such that they travel through the channels during motion transfer;
   first and second guide means associated with each set of channels, one set of channels adapted to control the travel of the rods of the drive disk as determined by its associated guide means, the other set of channels adapted to control travel of the rods of the driven disk as determined by its associated guide means.

6. The converter of claim 5 wherein each of said disks has four slots arranged along 45° lines and each set of drive and driven disks carries four rods.

7. The converter of claim 5 wherein the shafts are journaled to the walls.

8. The converter of claim 5 which includes means to synchronize the initial movement of the drive and driven disks.

9. The converter of claim 8 wherein the idle clutch comprises a first wheel having a plurality of studs extending from one surface thereof and an aperture in the center thereof, the studs received over the square section and supporting the wheel;
- means to hold resiliently the studs to the square section; and,
- an idle gear received over the studs whereby when the wheel is deflected the studs effect a locking action between the square section of the shaft and the gear and impart motion thereto.

10. The converter of claim 9 which includes at least two idle clutches and the driven shaft includes two gears in motion transfer relationship therewith whereby two different speeds may be effected to the driven shaft through actuation of the idle clutches.

11. The converter of claim 10 which includes a third idle clutch,
- a third gear secured to the driven shaft and an idle gear interposed between the third idle clutch and the third gear secured to the driven shaft in order that a reverse motion may be effected.

12. A torque converter which comprises:
 (a) a drive shaft having a drive disk secured thereto, the drive disk having a plurality of slots therein;
 (b) a driven shaft in motion transfer relationship with the drive shaft having at least one driven disk secured thereto, the driven disk having a plurality of slots therein, the shafts arranged in parallel relationship, the longitudinal axes of the shafts perpendicular to a pair of opposed walls;
 (c) a plurality of rods received in a movable manner in at least two of the slots of one of said disks to effect transfer of motion between the shafts, the disks positioned such that the rod is adapted to engage the slot of the other disk to effect the motion transfer;
 (d) means to control the conversion ratio (Y/X) between shafts which includes a plurality of guide sets defining channels, the guide sets positioned to intercept the path of the rods while the rods received in the slots of one disk are engaged in the slots of another disk, the guide sets positioned to intercept the path of the rods such that they travel through the channels during motion transfer, each of the guide sets corresponding to a different conversion ratio;
 (e) means to synchronize the initial movement of the drive and driven disks which includes:
- a friction clutch secured to the drive shaft and in communication with a source of power through a shaft having square and round sections;
- at least one idle clutch, the idle clutch secured to the square-round shaft and positioned between the source of power and the friction clutch;
- the driven shaft including at least one gear secured thereto, said gear in communication with the idle clutch whereby the idle clutch is used to transfer motion to the driven disk and the friction clutch is used to transfer motion to the drive disk to synchronize properly the disks for initial engagement.

13. The converter of claim 12 wherein the drive and driven shafts are journaled to the walls.

14. A torque converter which comprises:
 (a) a drive shaft having a drive disk secured thereto, the drive disk having at least one slot therein;
 (b) a driven shaft in motion transfer relationship with the drive shaft having at least one driven disk secured thereto, the driven disk having at least one slot therein, the shafts arranged in parallel relationship and wherein one of said disks includes first and second pairs of arms, each arm including a slot, the other disk comprising four slots, the arms secured to one of the shafts for unidirectional motion in reference to the shaft, means to effect radial displacement of the arms, one pair advanced relative to the other and control means to determine both when the arms are advanced and the amount of advancement to insure proper spacing between slots;
 (c) variable transfer means to effect transfer of motion between the shafts, said means received within one of the slots of one of the disks, the disks positioned such that said means is adapted to engage the slot of the other disk to effect the motion transfer; and,
 (d) means to control the conversion ratio (Y/X) between shafts.

15. The converter of claim 14 wherein the pairs of arms are secured to the drive shaft.

16. The converter of claim 15 which includes:
 two drive disks each comprising two pairs of arms,
 a driven disk which includes six radially arranged slots,
 the means to control the conversion ratio includes a guide set defining a channel, said guide set adjustably secured to the converter, the rods travelling through the channel, and
 means to provide a signal to the control means said signal corresponding to the conversion ratio.

17. The converter of claims 15 or 16 wherein:
 the means to effect radial displacement of the arms includes a camming plate secured to the drive shaft for axial movement the camming plate engaging both first and second pairs of arms, one of the pairs of arms advancing clockwise when the plate moves in a forward direction the other of the pair of arms moving clockwise when the plate moves in a rearward direction.

18. The converter of claim 17 which includes means to sense the angular displacement.
 means to sense the axial displacement between shafts means to provide an output from said sensors to a control means and means to provide a control signal to move the camming plate in response thereto.

19. A method for varying the conversion ratio (Y/X) between a fixed drive shaft and a fixed driven shaft, the shafts carrying at least one drive disk having a plurality of slots and one driven disk having a plurality of slots respectively, rods slidably received in the slots of both of said disks and wherein the guide sets define channels, each channel corresponding to a different conversion ratio which includes:
 establishing a conversion ratio;
 moving the drive shaft;
 engaging the rod of one disk in the slot of the other disk;
 controlling the travel of the rods of the drive and driven disks separately through the channels moving the driven shaft;
 changing from one conversion ratio to the other by actuating one of the guide sets;
 synchronizing the movement of the drive and the driven disks until the first engagement of a rod is accomplished by
 engaging a gear on the driven shaft with an idle clutch; and,
 engaging the drive shaft with a friction clutch.

* * * * *